US008903877B1

(12) United States Patent
Vempati et al.

(10) Patent No.: US 8,903,877 B1
(45) Date of Patent: Dec. 2, 2014

(54) EXTENT OF DATA BLOCKS AS AN ALLOCATION UNIT IN A UNIX-BASED FILE SYSTEM

(75) Inventors: Srinivasa R. Vempati, Upton, MA (US);
Sitaram Pawar, Shrewsbury, MA (US);
Philippe Armangau, Acton, MA (US);
Jean-Pierre Bono, Westboro, MA (US);
Christopher Seibel, Walpole, MA (US)

(73) Assignee: EMC Corporation, Hopkinton, MA (US)

( * ) Notice: Subject to any disclaimer, the term of this patent is extended or adjusted under 35 U.S.C. 154(b) by 128 days.

(21) Appl. No.: 13/282,376

(22) Filed: Oct. 26, 2011

(51) Int. Cl.
*G06F 12/00* (2006.01)
*G06F 17/30* (2006.01)

(52) U.S. Cl.
USPC .......................................................... 707/828

(58) Field of Classification Search
USPC .......................................................... 707/828
See application file for complete search history.

(56) References Cited

U.S. PATENT DOCUMENTS

| 5,893,140 | A | 4/1999 | Vahalia et al. |
|---|---|---|---|
| 6,499,039 | B1 | 12/2002 | Venkatesh et al. |
| 6,895,418 | B1 | 5/2005 | Crow et al. |
| 6,934,725 | B1 | 8/2005 | Dings |
| 6,938,039 | B1 | 8/2005 | Bober et al. |
| 7,107,385 | B2 | 9/2006 | Rajan et al. |
| 7,424,497 | B1 | 9/2008 | Leverett et al. |
| 7,620,671 | B2 | 11/2009 | Jiang et al. |
| 7,647,466 | B1 | 1/2010 | Rao et al. |
| 7,653,612 | B1 | 1/2010 | Veeraswamy et al. |
| 7,676,514 | B2 | 3/2010 | Faibish et al. |
| 7,870,356 | B1 | 1/2011 | Veeraswamy et al. |
| 7,945,726 | B2 | 5/2011 | Faibish et al. |
| 8,032,701 | B1 | 10/2011 | Glade et al. |
| 2003/0112267 | A1* | 6/2003 | Belrose .......................... 345/728 |
| 2004/0030822 | A1 | 2/2004 | Rajan et al. |
| 2005/0065986 | A1 | 3/2005 | Bixby et al. |
| 2005/0246382 | A1 | 11/2005 | Edwards |
| 2007/0136548 | A1 | 6/2007 | Mane |
| 2008/0126191 | A1* | 5/2008 | Schiavi .......................... 705/14 |

OTHER PUBLICATIONS

Vahalia, Uresh; "Unix Internals: The New Frontiers"; 1996, p. 187-290; Prentice Hall, Inc.; Upper Saddle River, NJ.*
Vahalia, Uresh, Unix Internals: The New Frontiers, 1996, p. 187-290, 338-371, Prentice-Hall, Inc., Upper Saddle River, New Jersey.

(Continued)

*Primary Examiner* — Khanh Pham
*Assistant Examiner* — Van Oberly
(74) *Attorney, Agent, or Firm* — Deepika Bhayana; Krishnendu Gupta (57) ABSTRACT

A file system has files constructed of an inode for each file, indirect blocks, and allocation units of file system data blocks. Each of the allocation units has one of the file system data blocks or a plurality of the file system data blocks having contiguous file system block numbers. Each file in the file system has a respective allocation unit size attribute specifying an allocation unit size of each and every allocation unit in the file, and the files in the file system have allocation units of different allocation unit sizes. By using larger allocation units for larger files, there is a reduction in the number of indirect blocks in the files without a corresponding loss in performance, and a reduction in the time needed for the UNIX FSCK utility to check file system consistency.

20 Claims, 8 Drawing Sheets

(56) References Cited

OTHER PUBLICATIONS

McVoy, L. W., and Kleiman, S. R., "Extent-like Performance from a UNIX File System," USENIX—Winter '91, Jan. 21-25, 1991, 12 pages, Dallas, TX, Sun Microsystems, Santa Clara, CA.

"Extent (file systems)," Wikipedia, May 29, 2007, 2 pages, Wikimedia Foundation Inc., St. Petersburg, FL.

Ext4 Howto, Jul. 25, 2011, 12 pages, ext4.wiki.kernel.org, Linux Kernel Organization, Inc., San Jose, CA.

Kang, Sukwoo, and Reddy, A. L. Narasimha, "Virtual Allocation: A scheme for flexible storage allocation," Proc. of OASIS workshop in conjunction with ASPLOS, Oct. 9-13, 2004, Boston, MA, 6 pages, Association for Computing Machinery, Washington, DC.

Fsck(8)—Linux man page, printed Jun. 30, 2006, 3 pages, die.net.

Sikand, Shiv, and March, Roger, "Highly Scalable, High Performance Perforce Server Environments," Perforce User Conference, May 8-9, 2003, Las Vegas, NV, 12 pages, Perforce Software Inc., Alameda, CA.

Trautman, Philip, and Mostek, Jim, "Scalability and Performance in Modern File Systems," printed May 6, 2005, 18 pages, Silicon Graphics, Mountain View, CA.

Figueirendo et al., "The PUNCH Virtual File System: Seamless Access to Decentralized Storage Services in a Computational Grid," Tenth IEEE International Symposium on High Performance Distributed Computing, Aug. 7-9, 2001, San Francisco, 11 pages, IEEE, Piscataway, NJ.

Florido, Juan Santos, "Journal File Systems," Linux Gazette, Jul. 2000, Issue 55, 11 pages, Seattle, WA.

* cited by examiner

EXTENT OF DATA BLOCKS AS AN ALLOCATION UNIT IN A UNIX-BASED FILE SYSTEM

FIELD OF THE INVENTION

The present invention relates generally to data processing machines, and more specifically to programming of a file server for management of a file system.

BACKGROUND OF THE INVENTION

Network data storage is most economically provided by an array of low-cost disk drives integrated with a large semiconductor cache memory. A number of data mover computers are used to interface the cached disk array to the network. The data mover computers perform file locking management and mapping of network files to logical block addresses of storage in the cached disk array, and move data between network clients and the storage in the cached disk array. See, for example, Vahalia et al. U.S. Pat. No. 5,893,140 issued Apr. 6, 1999, entitled "File Server Having a File System Cache and Protocol for Truly Safe Asynchronous Writes," incorporated herein by reference.

A UNIX-based file system permits each logical block in the extent of a file to be mapped to any physical block of storage the cached disk array. The UNIX-based file system also supports sparse files and possible sharing of specified data blocks between files for enabling "write somewhere else" snapshot copies, and de-duplication of specified data blocks The organization and management of a UNIX-based file system is described in Uresh Vahalia, *Unix Internals—The New Frontiers*, Chapter 9, File System Implementations, pp. 261-290, Prentice-Hall, Inc., Upper Saddle River, N.J. (1996). Files in a file system are organized in a hierarchy including a root directory, zero or more subdirectories, and zero or more regular data files. Each file itself is a hierarchy of file system blocks including an inode, one or more data blocks, and zero or more indirect blocks. Each file system data block in the file is linked to the inode or an indirect block of the file by a pointer in the inode or indirect block. There is a fixed and predetermined relationship between a given offset in the file and the location of the pointer field for a pointer to the data block containing the file data for the given offset in the file. The pointer in the block pointer field of an inode or an indirect block may have a zero value indicating that there is a "hole" in the extent of the file. Such a hole in the extent of the file represents a data block filed with zeroes.

Different UNIX-based file systems have used different file system block sizes. For example, some early UNIX-based file systems used a file system block size of 1 kilobyte, and more current versions use a file system block size of eight kilobytes. File system block size is known to affect file system performance in various ways. For example, a small block size is efficient for storing small files, such as files having an extent of data no greater than the block size. A large block size has a greater chance of a file's sectors being contiguous, and reduces the amount of overhead to list the file's blocks.

SUMMARY OF THE INVENTION

Presently there is a trend towards increasingly large files and increasingly large file systems. As the files and the file system grow in size, the file system check and recovery time also grows because the file system check and recovery time depends on the amount of metadata in the file system. It has been discovered that an efficient way of reducing this file system check and recovery time is for the large files to use an allocation unit of storage consisting of an extent of file system blocks having contiguous block numbers. In this case, it is possible to reduce the number of indirect blocks in a large file in proportion to the number of file system blocks in the allocation unit. Access to large files is improved by the contiguity of the file system bocks in each allocation unit. However, is still desirable for small files to use an allocation unit consisting of a single file system block. It is also desirable for some applications to use large sparse files having small holes. These objectives are frustrated by the fact that the size of the allocation unit in a conventional UNIX-based file system is fixed and equal to the file system block size. These objectives, however, are facilitated by permitting each file in the file system to have its own allocation unit size that is the same size as the file system block size or is an integral multiple of the file system block size. Each allocation unit consists of one file system block or a plurality of file system blocks having contiguous block numbers.

In accordance with one aspect, the invention provides a file server. The file server includes data storage storing a file system, and a data processor coupled to the data storage for access to files in the file system. The files are constructed of an inode for each of the files, indirect blocks, and allocation units of file system data blocks. Each of the allocation units has one of the file system data blocks or a plurality of the file system data blocks having contiguous file system block numbers. The file server further includes non-transitory computer readable storage medium coupled to the data processor and storing computer instructions including a file system manager program for managing the file system in the data storage. Each file in the file system has a respective allocation unit size attribute specifying an allocation unit size of each and every allocation unit in the file. However, the files in the file system have allocation units of different allocation unit sizes. The computer instructions, when executed by the data processor, perform a read access to a specified offset in a specified file in the file system by the steps of: (a) reading attributes of the specified file including the allocation unit size of the specified file, the allocation unit size of the specified file being at least two file system data blocks; (b) using the allocation unit size of the specified file and the specified offset of the specified file in a block mapping procedure to find an allocation unit pointer field in the inode of the specified file or in an indirect block of the specified file, the allocation unit pointer field being mapped to the specified offset in the specified file; and (c) reading an allocation unit pointer from the allocation unit pointer field found by the block mapping procedure, and using the allocation unit pointer to perform a read access to an allocation unit of the data storage in order to perform the read access to the specified offset in the specified file.

In accordance with another aspect, the invention provides a method of operating a file server. The file server has data storage storing a file system, and a data processor coupled to the data storage for access to files in the file system. The files are constructed of an inode for each of the files, indirect blocks, and allocation units of file system data blocks. Each of the allocation units has one of the file system data blocks or a plurality of the file system data blocks having contiguous file system block numbers. The file server has non-transitory computer readable storage medium coupled to the data processor and storing computer instructions including a file system manager program for managing the file system in the data storage. Each file in the file system has a respective allocation unit size attribute specifying an allocation unit size of each and every allocation unit in the file. However, the files in the file system have allocation units of different allocation unit sizes. The method includes the data processor executing the computer instructions to perform a write access to a specified offset in a specified file in the file system by the steps of: (a) reading attributes of the specified file including the allocation unit size of the specified file, the allocation unit size of the specified file being at least two file system data blocks; (b) using the allocation unit size of the specified file and the specified offset of the specified file in a block mapping procedure to find an allocation unit pointer field in the inode of the specified file or in an indirect block of the specified file, the allocation unit pointer field being mapped to the specified offset in the specified file; and (c) reading an allocation unit pointer from the allocation unit pointer field found by the block mapping procedure, and using the allocation unit pointer to perform a write access to an allocation unit of the data storage in order to perform the write access to the specified offset in the specified file.

In accordance with a final aspect, the invention provides a method of operating a file server. The file server has data storage storing a file system, and a data processor coupled to the data storage for access to files in the file system. The files are constructed of an inode for each of the files, indirect blocks, and allocation units of file system data blocks. Each of the allocation units has one of the file system data blocks or a plurality of the file system data blocks having contiguous file system block numbers. The file server has non-transitory computer readable storage medium coupled to the data processor and storing computer instructions including a file system manager program for managing the file system in the data storage. Each file in the file system has a respective allocation unit size attribute specifying an allocation unit size of each and every allocation unit in the file. However, the files in the file system have allocation units of different allocation unit sizes. The method comprises the data processor executing the computer instructions to perform a write access to a specified offset in a specified file in the file system by the steps of: (a) reading attributes of the specified file including the allocation unit size of the specified file, the allocation unit size of the specified file being at least two file system data blocks; (b) using the allocation unit size of the specified file and the specified offset of the specified file in a block mapping procedure to find an allocation unit pointer field in the inode of the specified file or in an indirect block of the specified file, the allocation unit pointer field being mapped to the specified offset in the specified file; and (c) finding that the allocation pointer field contains a zero value, and in response to finding that the allocation pointer field contains a zero value, allocating a new allocation unit of data storage to the specified file by writing an allocation unit pointer to the allocation unit to the allocation pointer field, the new allocation unit of data storage having the allocation unit size of the file, and writing data to the new allocation unit of the data storage in order to perform the write access to the specified offset in the specified file.

BRIEF DESCRIPTION OF THE DRAWINGS

Additional features and advantages of the invention will be described below with reference to the drawings, in which.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

Figure 1:
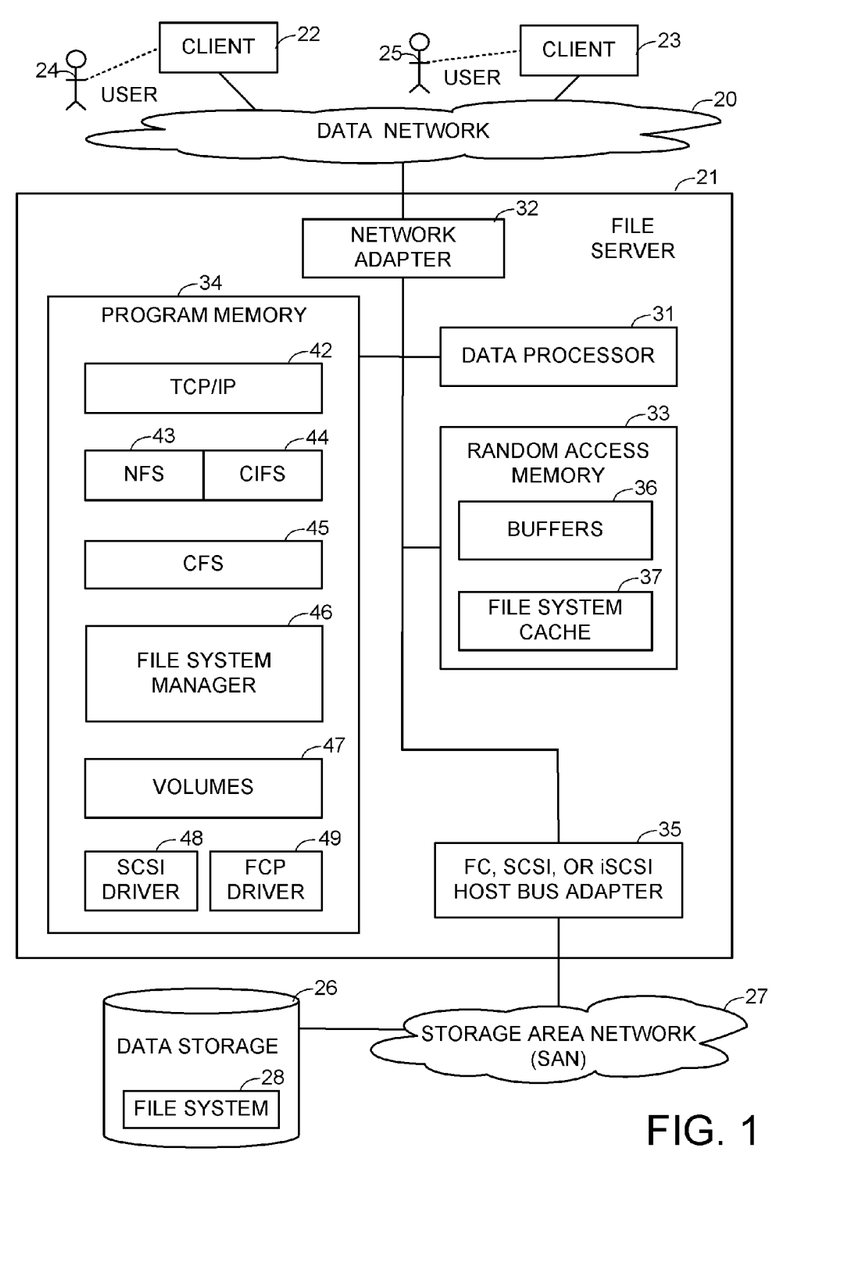
FIG. 1 is a block diagram of a network file server programmed with a file system manager in accordance with the present invention.

With reference to FIG. 1, there is shown a data network 20 including a file server 21 for servicing file access requests from network clients 22, 23. The network clients 22, 23, for example, are workstations operated by respective human users 24, 25. The file server permits the clients 22, 23 to access files in a file system 28 stored in data storage 26 linked to file server 21 via a storage area network (SAN) 27. The data storage 26, for example, is an array of disk drives.

The file server 21 includes a data processor 31, a network adapter 32 linking the data processor to the data network 20, random access memory 33, program memory 34, and a Fibre-Channel (FC), Small Computer Systems Interface (SCSI), or Internet Protocol SCSI (iSCSI) host bus adapter 35 linking the data processor to the storage area network (SAN) 27. The data processor 31 is a general purpose digital computer data processor including one or more core central processing units (CPUs) for executing computer program instructions stored in the program memory 34. The program memory 34 is a non-transitory computer readable storage medium, such as electrically erasable and programmable read-only memory (EEPROM). The random access memory 33 includes buffers 36 and a file system cache 37.

The program memory 34 includes a program layer 42 for network communication using the Transmission Control Protocol (TCP) and the Internet Protocol (IP). The program memory also includes a Network File System (NFS) module 43 for supporting file access requests using the NFS file access protocol, and a Common Internet File System (CIFS) module 44 for supporting file access requests using the CIFS file access protocol.

The NFS module 43 and the CIFS module 44 are layered over a Common File System (CFS) module 45. The CFS module 45 is layered over a file system manager module 46. The file system manager module 46 supports a UNIX-based file system, and the CFS module 45 provides higher-level functions common to NFS and CIFS. For example, the file system manager module 46 maintains the file system 28 in the data storage 26, and maintains the file system cache 37 in the random access memory 33.

The program memory 34 further includes a logical volumes layer 47 providing a logical volume upon which the file system 28 is built. The logical volume is configured from the data storage. For example, the logical volume is configured from one or more logical unit numbers (LUNs) of the data storage 26. The logical volumes layer 47 is layered over a SCSI driver 48 and a Fibre-Channel protocol (FCP) driver 49 in order to access the logical unit numbers (LUNs) in the storage area network (SAN) 27. The data processor 31 sends storage access requests through the host bus adapter 35 using the SCSI protocol, the iSCSI protocol, or the Fibre-Channel protocol, depending on the particular protocol used by the storage area network (SAN) 27.

Figure 2:
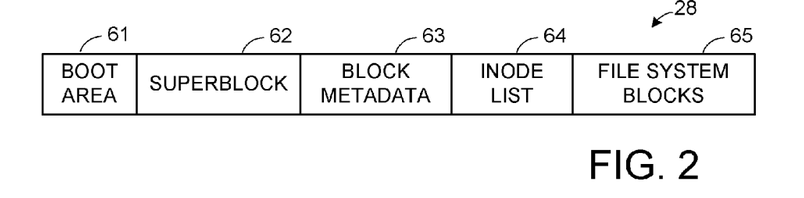
FIG. 2 is a block diagram of a UNIX-based file system in accordance with the present invention.

The conventional organization and management of a UNIX-based file system is described in Uresh Vahalia, *Unix Internals—The New Frontiers*, Chapter 9, File System Implementations, pp. 261-290, Prentice-Hall, Inc., Upper Saddle River, N.J. (1996). As shown in FIG. 2, the on-disk layout of the file system 28 includes a boot area 61, a superblock 62, an inode list 64, and file system blocks 65. The boot area 61 may contain code for booting an operating system. The superblock 62 contains attributes and metadata of the file system itself.

The inode list 64 is a linear array of inodes. There is one inode for each file in the file system. Each inode can be identified by its inode number, which equals its index in the inode list. Several inodes may fit into one of the file system blocks 65. The inode number can be easily translated into a block number and an offset of the inode from the start of the block. Each inode contains metadata of the file. (See Vahalia, page 263.) Some of the file system blocks 65 are data blocks, and other file system blocks may be indirect blocks, as described below with reference to FIG. 4, or free blocks that have not yet been allocated to any file in the file system.

In a preferred implementation, the file system 28 also includes block metadata 63. As will be further described below with reference to FIG. 5, this block metadata 63 includes zero flags for indicating file system data blocks that are to be interpreted as storing data having a value of zero. Therefore, instead of setting the content of a file system data block to zero, the respective zero flag for the file system data block can be set. In this way some time can be saved when it is desired to zero the content of a file system data block.

Figure 3:
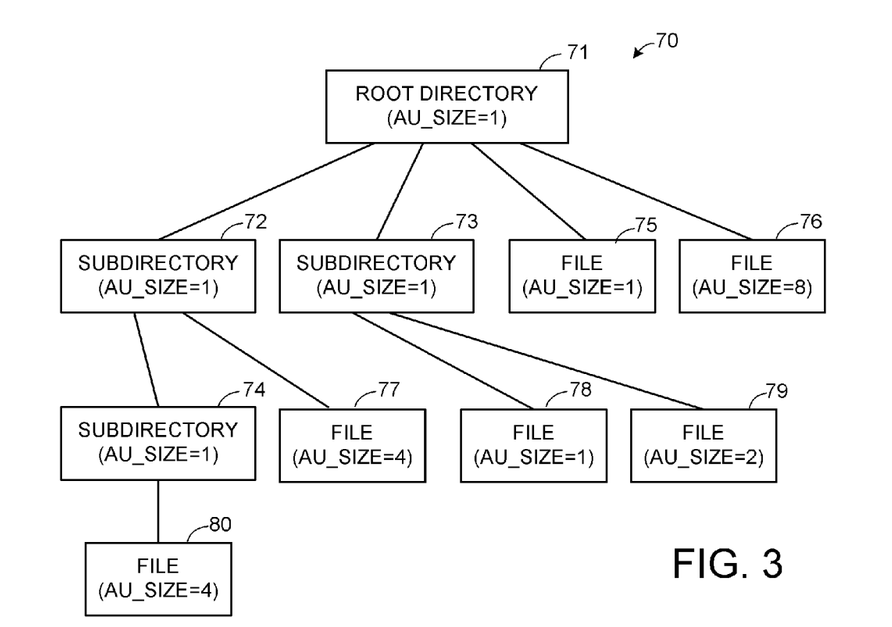
FIG. 3 is a block diagram of a user-visible file hierarchy in the UNIX-based file system.

FIG. 3 shows a user-visible file hierarchy in the file system 70 introduced in FIG. 1. The user-visible file hierarchy includes a root directory 71 of the file system 70, a number of subdirectories 72, 73, 74, and a number of regular files 75, 76, 77, 78, 879, 80. Each regular file is a leaf node in the file hierarchy. The root directory 71 may contain zero, one, or more subdirectories, and zero, one, or more regular data files. In the example of FIG. 3, the root directory 71 contains the subdirectories 72, 73, and the regular files 75, 76. Each subdirectory may contain zero, one, or more subdirectories, and zero, one, or more files. In the example of FIG. 3, the subdirectory 72 contains a subdirectory 74 and a regular file 77. The subdirectory 73 contains the regular files 78 and 79. The subdirectory 74 contains the regular file 80.

In accordance with an aspect of the present invention, each file of the file system 70 has a file attribute that specifies an allocation unit size (AU_SIZE). An allocation unit consists of one file system block or a plurality of file system blocks having contiguous block numbers. As a practical matter, it is also desirable for all of the file system blocks of each allocation unit to reside on the same storage device in order to simplify the allocation of the storage of the allocation unit and to simplify data recovery in case of error. For example, as shown in FIG. 3, the root directory 71 and the subdirectories 72, 73, 74 each have an allocation unit size of one file system block. The regular files have a variety of allocation unit sizes. The regular file 75 has an allocation unit size of one file system block, the regular file 76 has an allocation unit size of eight file system blocks, the regular file 77 has an allocation unit size of four file system blocks, the regular file 78 has an allocation unit size of one file system block, the regular file 79 has an allocation unit size of two file system blocks, and the regular file 80 has an allocation unit size of four file system blocks.

By using a large allocation unit size for a large file, the number of indirect blocks of the file is reduced inversely in proportion to the allocation unit size. This reduces the size of the large file to save storage space. More importantly, the reduction in the number of indirect blocks in the file results in a proportional reduction in the amount of time required to do a file system check of the file. For example, it is desired to keep the time to run the UNIX FSCK utility to check a one-petabyte file system under twenty-four hours.

The size of the allocation unit may also affect access performance of a file depending on the size, type, and usage of the file. In general, the allocation unit should not be larger than the amount of data to be stored in the file. In some cases, the user may see an increase in performance for a larger allocation unit size. For example, a large allocation unit size may improve the streaming of data from disk storage when reading a large file. In other cases, the user may see a decrease in performance for a larger allocation unit size. Allocation of a large allocation unit may take more time than allocation of a small allocation unit especially when free storage becomes defragmented. There is also a disadvantage in processing time when a read-write file having a large allocation unit size is accessed randomly by small write operations. Due to these considerations, the allocation unit size of a file is specified as an attribute of the file, so that different files in the file system may have different allocation unit sizes.

Figure 4:
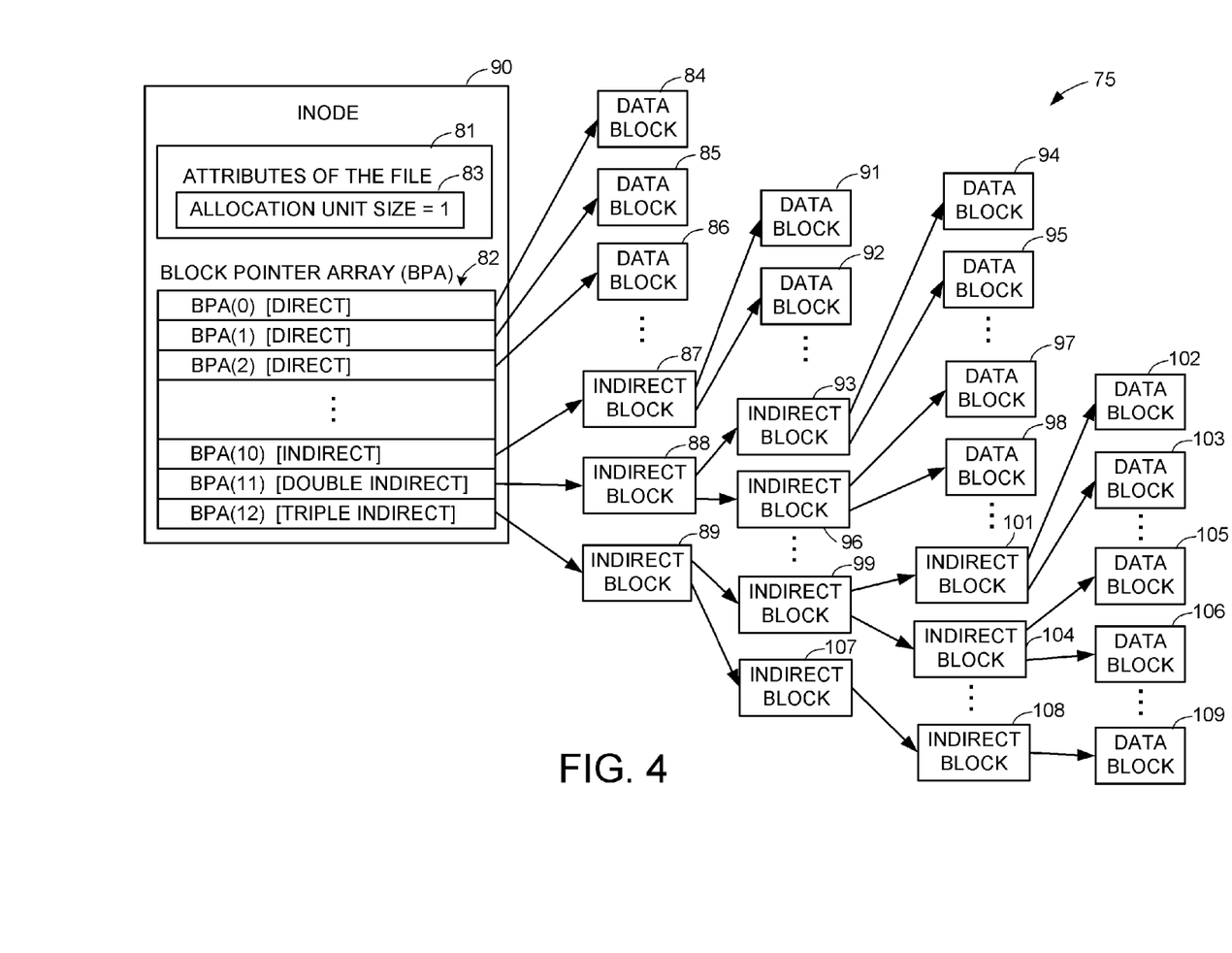
FIG. 4 is a block diagram of a file having an allocation unit size of one file system block in the UNIX-based file system.

FIG. 4 shows the construction of the file 75 having an allocation unit size of one file system block. In this case the mapping of the logical extent of the file 75 to the data blocks of the file is the same as the conventional mapping found in a UNIX-based file system. The file 75 includes an inode 90 containing attributes 81 of the file, and a block pointer array 82. The attributes 81 of the file include the allocation unit size in a field 83 of the inode 90. The block pointer array 82 has thirteen block pointer array entries having respective values BPA(0) to BPA(12). The first of up to ten entries BPA(0) to BPA(9) directly point to the first of up to ten data blocks 84, 85, 86, etc. of the file 75. (See Vahalia, FIG. 9-4, page 265.)

If the file 75 contains more than ten data blocks, then the eleventh entry of the block pointer array 82 contains an indirect block pointer BPA(10) pointing to an indirect block 87 containing pointers to one or more additional data blocks 91, 92, etc. If the file 75 contains so many data blocks that the indirect block 87 becomes full of block pointers, then the twelfth entry of the block pointer array 83 contains a double indirect block pointer BPA(11) to an indirect block 88 that itself points to an indirect block 93 that points to one or more additional data blocks 94, 95, etc. If the file 75 is so large that the indirect block 93 becomes full of block pointers, then the indirect block 88 will point to at least one more indirect block 96 that points to one or more additional data blocks 97, 98, etc.

If the file 75 is so large that the indirect block 88 becomes full of block pointers and its descendant indirect blocks are also full of block pointers, then the thirteenth entry of the block pointer array 82 contains a triple indirect block pointer BPA(12) to an indirect block 89 that points to an indirect block 99 that points to an indirect block 101 that points to one or more additional data blocks 102, 103, etc. If the file is so large that the indirect block 101 becomes full of pointers, then the indirect block 99 points to another indirect block 104 that points to one or more data blocks 105, 106, etc. If the file is so large that the indirect block 99 and its descendant indirect blocks are also full of pointers, then the indirect block 89 points to another indirect block 107 that points to yet another indirect block 108 that points to at least one data block 109, and so on. Once the indirect block 89 and its descendant indirect blocks become full of pointers, the file contains a maximum permitted number of data blocks.

Figure 5:
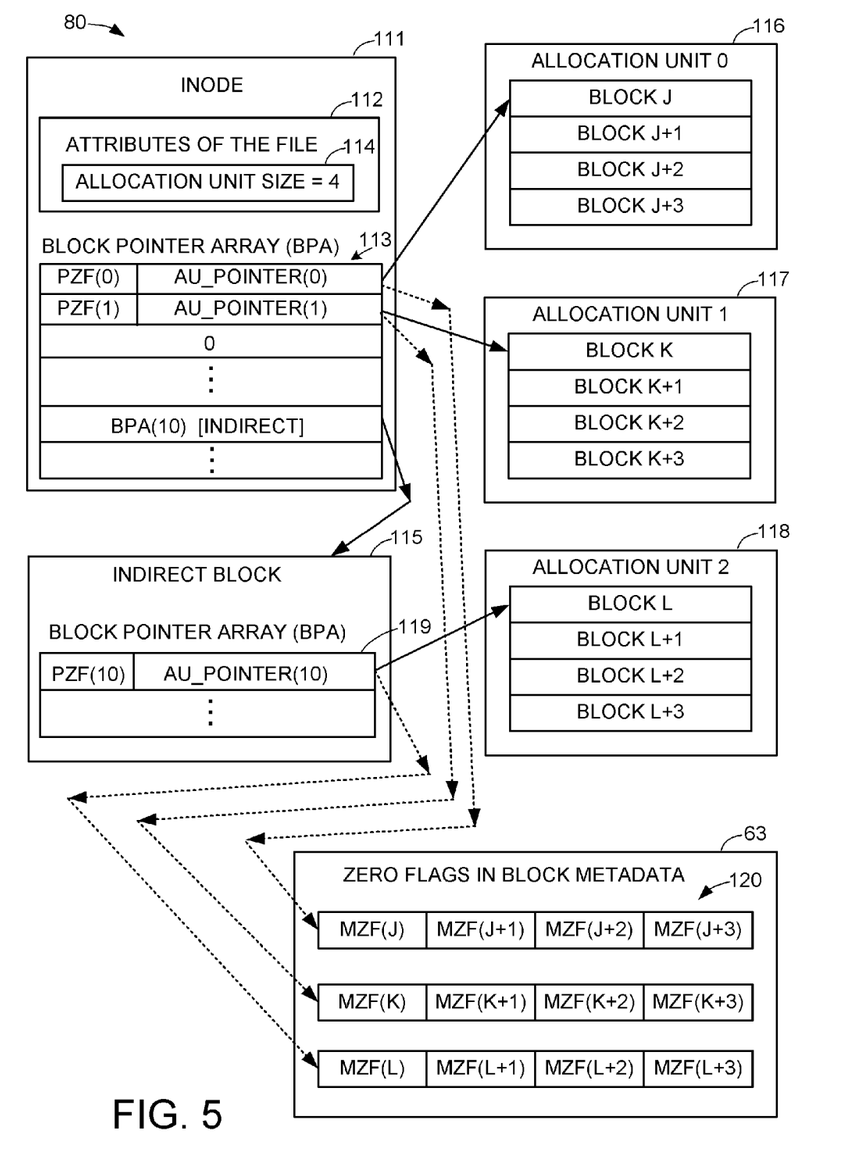
FIG. 5 is a block diagram of a file having an allocation unit size of four file system blocks in the UNIX-based file system.

FIG. 5 is a block diagram of the file 80 having an allocation unit size of four file system blocks. The file 80 has an inode 111 containing attributes 112 and a block pointer array 113. The file attributes 112 include an allocation unit size in a field 114 in the inode 111. The file 80 also has an indirect block 104 and three allocation units 115, 116, 117, and 118. Each of the allocation units 113, 116, 117, and 118 includes four file system blocks having contiguous block numbers. For example, the file system blocks in the first allocation unit 116 have block numbers J, J+1, J+2, and J+3. The file system blocks in the second allocation unit 117 have block numbers K, K+1, K+2, and K+3. The file system blocks in the third allocation unit 118 have block numbers L, L+1, L+2, and L+3.

In comparison to the file organization of FIG. 4, the data block pointers in the block pointer array 113 have been replaced with allocation unit (AU) pointers. For example, the first allocation unit pointer (AU_POINTER(0)) points to the first block (BLOCK J) of the first allocation unit 116. The second allocation unit pointer (AU_POINTER(1)) points to the first block (BLOCK K) of the second allocation unit 117. Also, the data block pointers in the indirect block 115 have also been replaced with allocation unit pointers. For example, the first pointer entry 119 in the indirect block 115 includes an allocation unit pointer (AU_POINTER(10)) pointing to the first block (BLOCK L) of the third allocation unit 118.

An allocation unit pointer field in the inode 111 or in an indirect block 115 may have a zero value indicating a "hole" in the extent of the file 80. Such a hole does not have an allocation unit of storage and represents file data having a value of zero. For example, the third block pointer field 121 in the block pointer array 113 of the inode 111 has a zero value indicating such a hole.

If the allocation unit size of the file is a large number of file system blocks and the file is sparse, then there will be a loss of performance for small random writes to holes in the file. The loss of performance occurs because a small write to a hole requires allocation of a new allocation unit much larger than the data of the small write. The hole is filled with the new allocation unit, and then the data of the small write is written to a portion of the new allocation unit. There also must be a way of zeroing the portion of the new allocation unit that is not written to. The worst case occurs when the data of the small write is written to the middle of the new allocation unit, so that the new allocation unit must be zeroed before and after the data written to the middle of the new allocation unit.

The file structure of FIG. 5 shows a way of using metadata zero flags (MZF) 120 in the block metadata 63 for zeroing file system blocks of newly allocated allocation units that are not written to. The metadata zero flags 120 are arranged as a bitmap or table, so that each file system block has a respective metadata zero flag in the bitmap or table, and this respective flag is indexed by the block number of the file system data block. Therefore each allocation unit pointer (AU_POINTER) to an allocation unit of a file in the file system also points to a series of metadata zero flags indicating whether or not the file system blocks in the allocation unit are to be considered as containing data having a value of zero. For example, the metadata zero flag MZF(J+2) indicates whether or not BLOCK J+2 in the first allocation unit 116 is to be considered as containing data having a value of zero.

In many or most cases, an allocation unit in a file will not have any file system blocks considered as containing data having a value of zero. Therefore some time can be saved by keeping pointer zero flags (PZF) in the allocation unit pointer fields of the inode block pointer array 113 and in allocation unit pointer fields the leaf-level indirect blocks such as the indirect block 115. It is most convenient for the pointer zero flag to be the most significant bit in the allocation unit pointer field. For example, if and only if the pointer zero flag PZF(0) is set in the first entry of the block pointer array 113 of the inode 111, then one or more of the metadata zero flags MZF (J), MZF(J+1), MZF(J+2), and MZF(J+3) are set to indicate that one or more of the file system blocks of the first allocation unit 116 are considered to contain data having a value of zero.

Figure 6:
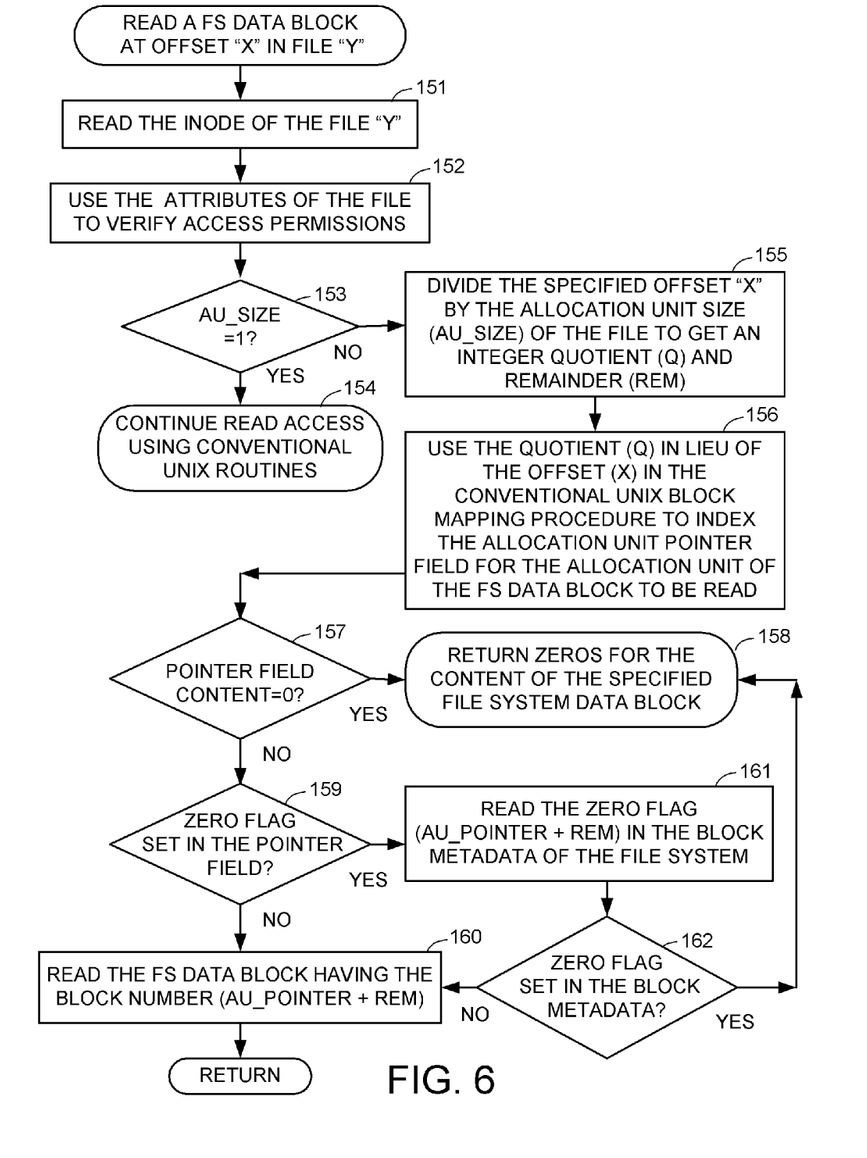
FIG. 6 is a flowchart of a subroutine of the file system manager for reading a file system data block at a specified offset in a specified file.

FIG. 6 shows a subroutine of the file system manager (46 in FIG. 1) for reading a file system data block at a specified offset (X) in a specified file (Y). For example, the offset is specified in blocks, and the file is specified by a file handle or a file ID. In a first step 151, the file system manager reads the inode of the specified file (Y). Next, in step 152, the file system manager uses the attributes of the file as read from the inode in order to verify access permissions of the client or application requesting read access to the file. Once the access permissions are verified, execution continues to step 153.

In step 153, if the allocation unit size (AU_SIZE) of the file is equal to one, then execution continues to step 154 to continue read access using conventional UNIX routines. In this case, except for the addition of the allocation unit size attribute in the inode, the file is organized in a conventional fashion.

In step 153, if the allocation unit size is not equal to one, then execution branches from step 153 to step 155. In this case, the allocation unit size is an integer greater than one. In step 155, the specified offset "X" in blocks is divided by the allocation unit size of the file to get an integer quotient (Q) and an integer remainder (REM). The integer quotient (Q) identifies the Qth allocation unit that is mapped to the logical extent of the file and includes the Xth block in the logical extent of the file. The integer remainder (REM) identifies the REMth block that is in this Qth allocation unit and includes the Xth block in the logical extent of the file.

In step 156, the quotient (Q) is used in lieu of the offset (X) in the conventional UNIX block mapping procedure to index the allocation unit pointer field for the allocation unit of the file system data block to be read. Execution continues from step 156 to step 157. In step 157, if the content of the indexed pointer field is zero, then the Qth allocation unit is a hole in the file, and execution branches to step 158 to return zeros for the content of the specified file system data block at the file offset "X".

In step 157, if the content of the indexed pointer field is not zero, then execution continues from step 157 to step 159. In step 159, if the zero flag is not set in the allocation unit pointer field, then execution continues to step 160. In step 160, the AU_POINTER is read from the pointer field, and then file system data block having the block number (AU_POINTER+ REM) is read from the data storage, and the data read from this file system data block is returned.

In step 159, if the zero flag is set in the pointer field, then execution branches to step 161 to read the AU_POINTER from the pointer field, and to read the block metadata zero flag indexed by (AU_POINTER+REM). In step 162, if this block metadata zero flag is set, then execution branches to step 158 to return zeros for the content of the specified file system data block. Otherwise, if this block metadata flag is not set, then execution branches to step 160 to read the file system data block (AU_POINTER+REM) from the data storage, and to return the data read from this file system data block.

Figure 7:
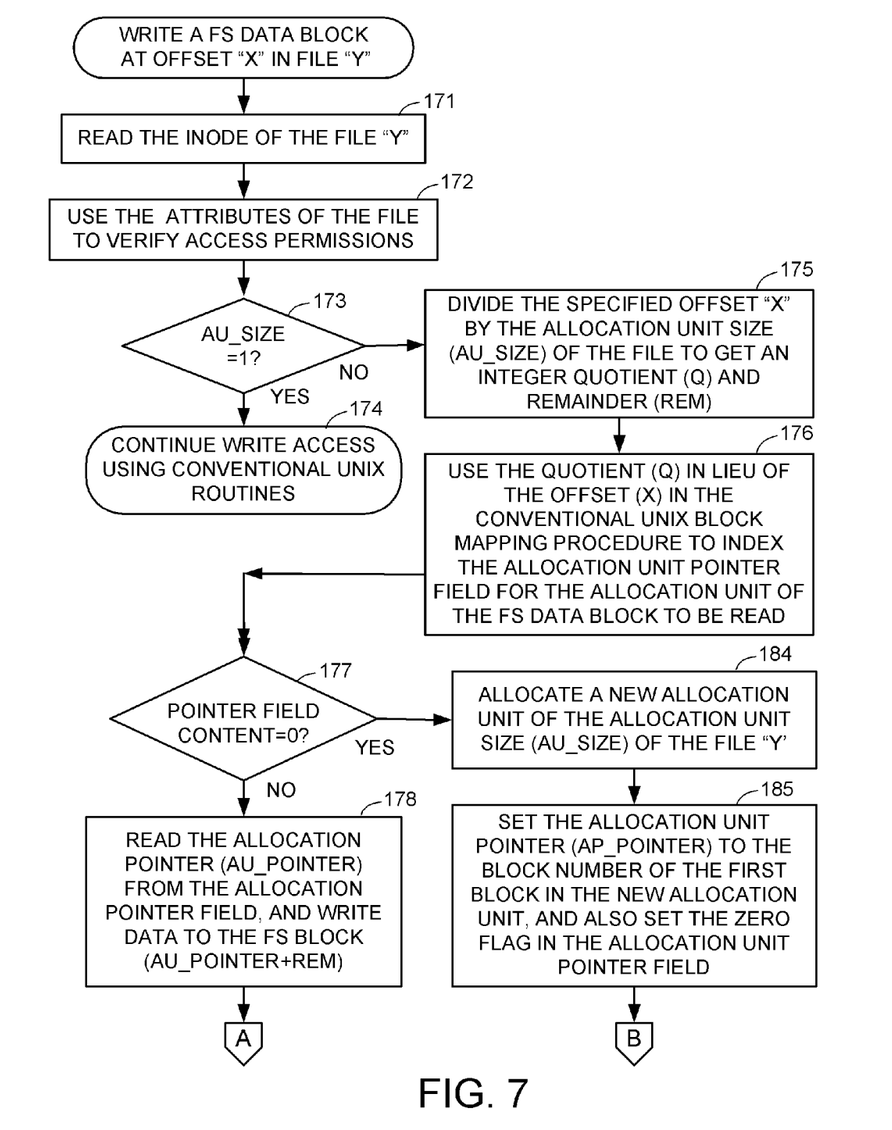
FIGS. 7 and 8 together comprise a flowchart of a subroutine of the file system manager for writing to a file system data block at a specified offset in a specified file.

FIG. 7 shows a subroutine of the file system manager (46 in FIG. 1) for writing to a file system data block at a specified offset (X) in a specified file (Y). For example, the offset is specified in blocks, and the file is specified by a file handle or a file ID. In a first step 171, the file system manager reads the inode of the specified file (Y). Next, in step 172, the file system manager uses the attributes of the file as read from the inode in order to verify access permissions of the client or application requesting write access to the file. Once the access permissions are verified, execution continues to step 173.

In step 173, if the allocation unit size (AU_SIZE) of the file is equal to one, then execution continues to step 174 to continue write access using conventional UNIX routines. In this case, except for the addition of the allocation unit size attribute in the inode, the file is organized in a conventional fashion.

In step 173, if the allocation unit size is not equal to one, then execution branches from step 173 to step 175. In this case, the allocation unit size is an integer greater than one. In step 175, the specified offset "X" in blocks is divided by the allocation unit size of the file to get an integer quotient (Q) and an integer remainder (REM). The integer quotient (Q) identifies the Qth allocation unit that is mapped to the logical extent of the file and includes the Xth block in the logical extent of the file. The integer remainder (REM) identifies the REMth block that is in this Qth allocation unit and includes the Xth block in the logical extent of the file.

In step 176, the quotient (Q) is used in lieu of the offset (X) in the conventional UNIX block mapping procedure to index the allocation unit pointer field for the allocation unit of the file system data block to be written. Execution continues from step 176 to step 177. In step 177, if the content of the indexed pointer field is not zero, then execution continues to step 178 to read the allocation unit pointer (AU_POINTER) from the allocation pointer field, and to write data to the file system block having the block number (AU_POINTER+REM) in the data storage. Execution continues from step 178 to step 179 in FIG. 8.

Figure 8:
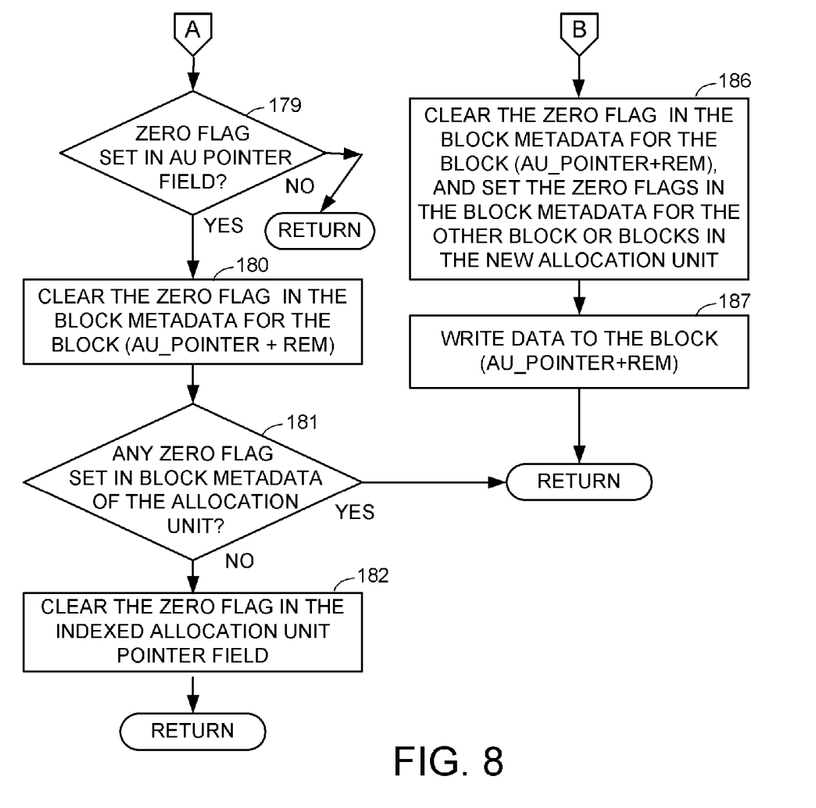

In step 179 in FIG. 8, if the zero flag is not set in the indexed allocation pointer field, then execution returns with an acknowledgement of completion of the requested write operation. Otherwise, if the zero flag is set in the indexed allocation pointer field, then execution continues from step 179 to step 180. In step 180, the block metadata zero flag for the block (AU_POINTER+REM) is cleared. In step 181, if any zero flag is still set in the block metadata of the allocation unit (AU_POINTER), then execution returns with an acknowledgement of completion of the requested write operation. Otherwise, if all of the block metadata zero flags for the allocation unit (AU_POINTER) are clear, then execution continues from step 181 to step 182. In step 182, the zero flag in the indexed allocation unit pointer field is cleared, and then execution returns with an acknowledgement of completion of the requested write operation.

In step 177 of FIG. 7, if the indexed pointer field content is zero, then there is a hole at the specified offset (X) in the extent of the file, and execution branches to step 184. In step 184, a new allocation unit of the allocation unit size of the file (Y) is allocated to the file (Y), and in step 185, the indexed allocation unit pointer field is set to the first block number of the first block of this new allocation unit of storage, and also the zero flag is set in the indexed allocation unit pointer field. Execution continues from step 185 to step 186 in FIG. 8.

In step 186 of FIG. 8, the zero flag is cleared in the block metadata for the block having the block number (AU_POINTER+REM), and the zero flags are set in the block metadata for the other block or blocks in the new allocation unit. In step 187, data is written to the file system block having the block number (AU_POINTER+REM), and execution returns with an acknowledgement of completion of the requested write operation.

In a preferred implementation, the allocation unit size of a file is explicitly specified by the creator of the file when the file is created, or else the allocation unit size of the file is set by a policy when the file is created. In general, the policy sets the allocation unit size of the file at the file creation time based on the file type and the expected size and usage of the file during the lifetime of the file.

Figure 9:
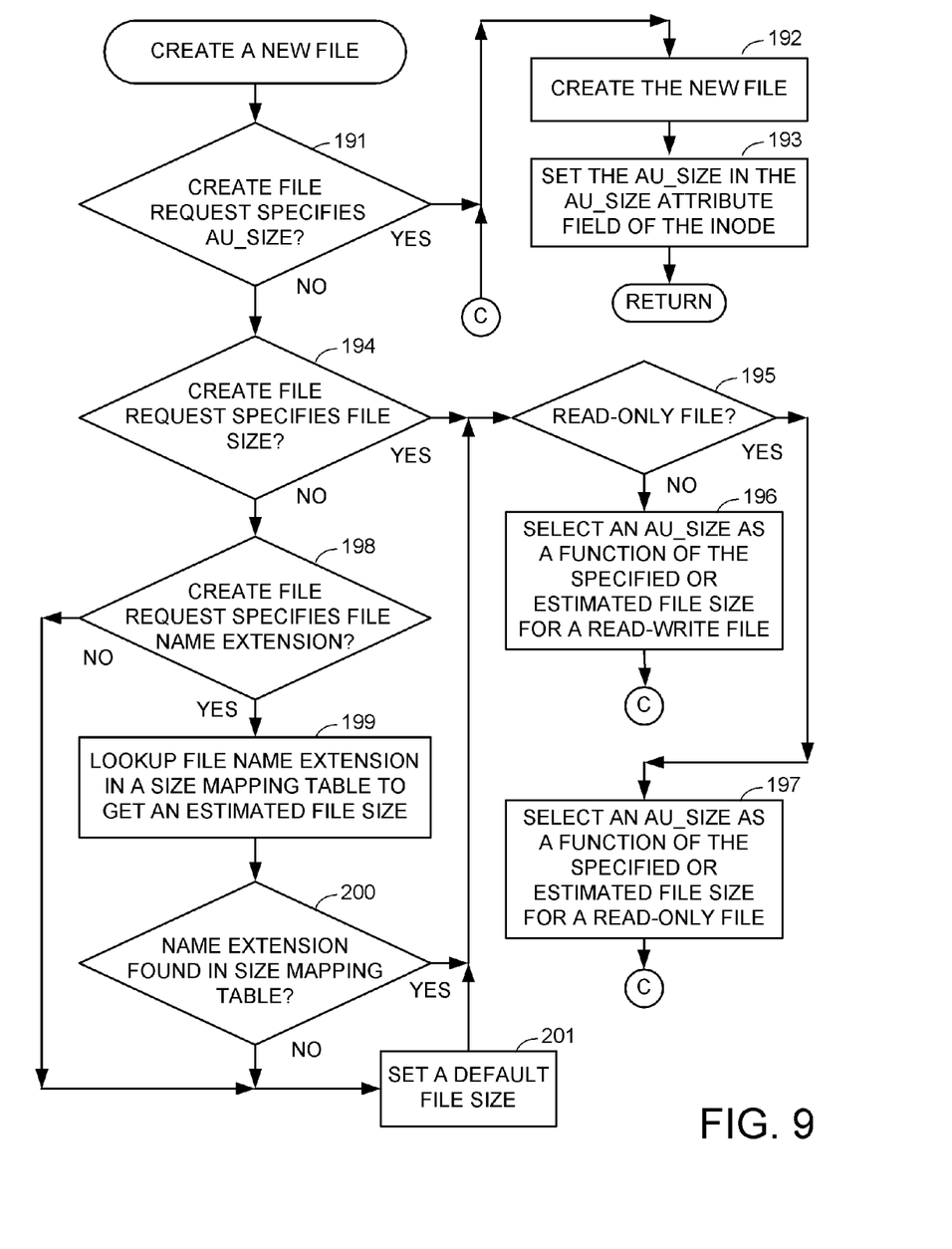
FIG. 9 is a flowchart of a subroutine of the file system manager for setting the allocation unit size of a file when the file is created.

FIG. 9 shows an example of how the allocation unit size of a file is set when the file system manager responds to a request from a user or application for the creation of a regular file. In a first step 191, if the create file request specifies an allocation unit size, then execution branches to step 192 to create the new file, and then in step 193, the specified allocation unit size (AU_SIZE) is set in the allocation unit size field of the inode of the file. After step 193, execution returns with an acknowledgement that the file has been created.

In step 191, if the create file request does not specify an allocation unit size, then execution continues to step 194. In step 194, if the create file request specifies a file size, then execution branches to step 195. In step 195, if the file is not a read-only file, then execution continues to step 196. In step 196, the allocation unit size (AU_SIZE) of the file is selected as a function of the specified file size. For example, the allocation unit size is selected from a set of permissible allocation unit sizes (such as one, two, four, or eight file system blocks) based on a policy for read-write files. In general, larger allocation unit sizes are selected for larger files. After step 196, execution continues to step 192 to create the file, and then to step 193 to set the selected allocation unit size in the allocation unit size field of the inode of the file.

In step 195, if the file is a read-only file, then execution branches to step 197. In step 197, the allocation unit size (AU_SIZE) of the file is selected as function of the specified file size. In general, larger allocation unit sizes are selected for read-only files than read-write files. After step 197, execution continues to step 192 to create the file, and then to step 193 to set the selected allocation unit size in the allocation unit size field of the inode of the file.

In step 194, if the create file request does not specify a file size, then execution continues to step 198. In step 198, if the create file request specifies a file name extension, then execution branches to step 199 to lookup the file name extension in a size mapping table to get an estimated file size. In step 200, if the name extension is not found in the size mapping table, then execution continues to step 201 to set a default file size. Execution also branches from step 198 to step 201 to set a default file size if the create file request does not specify a file name extension. Execution continues from step 201 to step 195. Execution also continues from step 200 to step 195 if the file name extension if found in the size mapping table. Therefore the estimated or default file size is used to select the allocation unit size in step 196 or step 197 depending on whether the file is a read-write file or a read-only file.

A specific example of an application using a create file request specifying an allocation unit size is the file system manager creating a directory in the file system. The file system manager, for example, specifies an allocation unit size of one file system data block having a size of eight kilobytes.

A specific example of an application using a create file request specifying a file size is a "file copy" utility function. The "file copy" utility function, for example, gets the size of a source file, and then sends a "create file" request specifying the size in order to create the target file, and then reads data from the source file and writes this data to the target file.

As described above with reference to FIGS. 6, 7, 8, and 9, read and write operations do not change the allocation unit size of a file, and the allocation unit size of a file is set when the file is created. However, a user or application may want to change the allocation unit size of a file well after the file has been created. For example, an application may want to append new data to the file, and then make the file available as a "read-only" file to other applications, so that the file is increased in size by many times its original size. In this case, the application may want the enlarged file to have an increased allocation unit size. The application can do this by creating a new file having the increased allocation unit size, copying the data of the original file to the new file, deleting the original file, renaming the new file to assume the name of the original file, and then appending the new data to the new file.

It is desirable to modify additional UNIX file system manager routines to take into consideration that the allocation unit size of the file may include multiple file system blocks having contiguous block numbers. For example, it is most convenient to extend or truncate a file in increments of the allocation unit size of the file. It is also most convenient to take range locks on a file by taking range locks on the allocation units of the file. Pre-allocation of file system blocks for a file should be performed by pre-allocating allocation units of the allocation unit size of the file. Routines that calculate the number of indirect blocks required to map a given offset should also take into consideration the allocation unit size of the file.

Various utility applications should also take into consideration the allocation unit size of the file. Typically a compression utility should not compress data at a granularity of less than the allocation unit of the file because compression is less effective over the smaller granularity. If the compression utility is unaware of a change in granularity caused by the increased allocation unit size, data loss may occur due to confusion between valid data and padding of an unused portion of an allocation unit of multiple file system blocks. If the compression is made aware of the allocation unit size, then compression can be made more effective as the allocation unit size increases.

On the other hand, de-duplication becomes less effective as the allocation unit size increases. Therefore files that should be de-duplicated should have a smaller allocation unit size. De-duplication by files sharing blocks is most convenient when the files have the same allocation unit size. In practice it is expedient to prohibit block sharing among files having different allocation unit sizes.

A utility application may reorganizes a file by copying data from source data blocks in the file to newly allocated target data blocks and substituting block pointers to the new target data blocks. Such a utility application should also take into consideration the allocation unit size of the file. Otherwise files having an allocation unit size greater than one file system block may lose all but the first data block in each allocation unit during the reorganization process.

An advantage to using an extent of file system blocks as an allocation unit as described above is that minimal changes need to be made to the conventional UNIX file system manager routines in order to change the allocation unit from a single file system block to one or more contiguous file system blocks. The changes can be minimized by restricting the permissible set of allocation unit sizes to a limited range, such as one, two, four and eight file system blocks, and by aligning the allocation units on binary block address boundaries. Such an implementation can be extended later incrementally by enlarging the permissible set of allocation unit sizes to include larger allocation units, such as allocation units having sixteen or thirty-two file system blocks. Restricting the permissible set of allocation unit sizes aligned on binary block address boundaries also facilitates the construction of lookup tables to accelerate mapping and logical offset calculation routines.

In a similar way, other operations can be accelerated by writing an optimized routine to handle each permissible allocation unit size. For example, the step of determining whether any zero flag is set in the block metadata of the allocation unit (step 181 of FIG. 8) could be done by testing the block metadata zero flags in series, and such a procedure could handle an allocation unit having any number of file system blocks. However, the block metadata flags can be tested more quickly in parallel for a given allocation unit size by using a logical operation upon a bit mask for the given allocation unit size and testing whether the byte, word, or double-word result is zero.

In view of the above, the files in a UNIX based file system are constructed of inodes, indirect blocks, and file system data blocks. To reduce the number of indirect blocks in a large file, the data block allocation unit for the large file is an extent of file system data blocks having contiguous block numbers. The allocation unit size for the file is an attribute of the file stored in a field in the inode of the file. Thus, different files in the UNIX-based file system may have different allocation unit sizes having one file system block or a plurality of contiguous file system blocks. In each file, the block pointer arrays in the indirect block and in any indirect block include allocation unit pointers pointing to allocation units having the same size in the file. A pointer field in an inode or indirect block may also have a zero value indicating that there is a "hole" in the file, and the hole has a size that is the allocation unit size for the file. The reduction in the number of indirect blocks for the file reduces the size of the file and more importantly reduces the time to check the file system for consistency using the UNIX FSCK utility.

What is claimed is:

1. A file server comprising:
   data storage storing a file system; and
   a data processor coupled to the data storage for access to files in the file system, the files being constructed of an inode for each of the files, indirect blocks, and allocation units of file system data blocks, each of the allocation units having one of the file system data blocks or a plurality of the file system data blocks having contiguous file system block numbers;
   non-transitory computer readable storage medium coupled to the data processor and storing computer instructions including a file system manager program for managing the file system in the data storage;
   wherein each file in the file system has a respective allocation unit size attribute specifying an allocation unit size of each and every allocation unit in said each file, and the files in the file system have allocation units of different allocation unit sizes, wherein a set of contiguous file system blocks are allocated as an allocation unit for each file in the file system based on the allocation unit size for said each file, wherein an indirect block of each file includes a set of allocation unit pointer fields, each allocation unit pointer field pointing to an allocation unit of said each file;

wherein the computer instructions, when executed by the data processor, perform a read access to a specified offset in a specified file in the file system by the steps of:
(a) reading attributes of the specified file including the allocation unit size of the specified file, the allocation unit size of the specified file being at least two file system data blocks;
(b) using the allocation unit size of the specified file and the specified offset of the specified file in a block mapping procedure to find an allocation unit pointer field in the inode of the specified file or in an indirect block of the specified file, the allocation unit pointer field being mapped to the specified offset in the specified file, the allocation unit pointer field is determined by dividing the specified offset of the specified file by the allocation unit size of the specified file; and
(c) reading an allocation unit pointer from the allocation unit pointer field found by the block mapping procedure, and using the allocation unit pointer to perform a read access to an allocation unit of the data storage in order to perform the read access to the specified offset in the specified file, wherein a file system block for performing the read access is determined from the allocation unit pointer by using a result of dividing the specified offset of the specified file by the allocation unit size of the specified file.

2. The file server as claimed in claim 1, wherein the allocation unit size of the specified file is stored in an attribute field in the inode of the specified file, and the step (a) includes reading the allocation unit size of the specified file from the attribute field in the inode of the specified file.

3. The file server as claimed in claim 1, wherein the allocation unit pointer is a file system block number of a first file system block in the allocation unit of data storage accessed in said step (c).

4. The file server as claimed in claim 1, wherein the file system includes block metadata, the block metadata includes zero flags for indicating whether or not respective file system data blocks are to be considered as storing data having a value of zero, and step (c) includes using the allocation pointer to read a zero flag in the block metadata when performing a read access upon a respective file system data block at the specified offset in the specified file, and upon finding that the zero flag indicates that the respective file system data block at the specified offset in the specified file is to be considered as storing data having a value of zero, returning a value of zero as a result of the read access upon the respective file system data block at the specified offset in the specified file.

5. The file server as claimed in claim 4, wherein the pointer field contains a zero flag indicating whether or not at least one file system data block of the allocation unit of the data storage has a respective zero flag indicating that said at least one file system data block of the allocation unit of the data storage is considered as storing data having a value of zero, and the allocation pointer is used to read the zero flag in the block metadata in step (c) in response to finding that the zero flag in the pointer field indicates that at least one file system data block of the allocation unit has a respective zero flag indicating that said at least one file system data block of the allocation unit of the data storage is considered as storing data having a value of zero.

6. The file server as claimed in claim 1, wherein the computer instructions, when executed by the data processor, further respond to a request to create a new file having a specified allocation unit size by allocating an inode for the file, and then writing the specified allocation unit size in an allocation unit size field in the inode.

7. The file server as claimed in claim 1, wherein the computer instructions, when executed by the data processor, further respond to a request to create a new file by allocating an inode for the new file, selecting an allocation unit size for the new file based on an expected size of the new file and attributes of the new file, and then writing the selected allocation unit size in an allocation unit size field in the inode for the new file.

8. A file server comprising:
data storage storing a file system;
a data processor coupled to the data storage for access to files in the file system, the files being constructed of an inode for each of the files, indirect blocks, and allocation units of file system data blocks, each of the allocation units having one of the file system data blocks or a plurality of the file system data blocks having contiguous file system block numbers; and
non-transitory computer readable storage medium coupled to the data processor and storing computer instructions including a file system manager program for managing the file system in the data storage;
wherein each file in the file system has a respective allocation unit size attribute specifying an allocation unit size of each and every allocation unit in said each file, and the files in the file system have allocation units of different allocation unit sizes;
wherein the computer instructions, when executed by the data processor, perform a read access to a specified offset in a specified file in the file system by the steps of:
(a) reading attributes of the specified file including the allocation unit size of the specified file, the allocation unit size of the specified file being at least two file system data blocks;
(b) using the allocation unit size of the specified file and the specified offset of the specified file in a block mapping procedure to find an allocation unit pointer field in the inode of the specified file or in an indirect block of the specified file, the allocation unit pointer field being mapped to the specified offset in the specified file; and
wherein the step (b) is performed by dividing the specified offset by the allocation unit size of the specified file to produce an integer quotient, and using the integer quotient in a conventional UNIX block mapping procedure to find an allocation unit pointer field in the inode of the specified file or in an indirect block of the specified file, the allocation unit pointer field being mapped to the specified offset in the specified file.

9. The file server as claimed in claim 8, wherein step (b) further includes producing an integer remainder of the division of the specified offset by the allocation unit size of the specified file, and step (c) further includes adding the allocation pointer to the integer remainder to produce a file system block number, and performing a read access to a file system block having the file system block number to perform the read access to the specified offset of the specified file.

10. A method of operating a file server, the file server having data storage storing a file system, and a data processor coupled to the data storage for access to files in the file system, the files being constructed of an inode for each of the files, indirect blocks, and allocation units of file system data blocks, each of the allocation units having one of the file system data blocks or a plurality of the file system data blocks having contiguous file system block numbers, and the file server having non-transitory computer readable storage medium coupled to the data processor and storing computer instructions including a file system manager program for managing the file system in the data storage, and each file in the file system having a respective allocation unit size attribute specifying an allocation unit size of each and every allocation unit in said each file, and the files in the file system having allocation units of different allocation unit sizes, a set of contiguous file system blocks being allocated as an allocation unit for each file in the file system based on the allocation unit size for said each file, an indirect block of each file including a set of allocation unit pointer fields, each allocation unit pointer field pointing to an allocation unit of said each file, said method comprising the data processor executing the computer instructions to perform a write access to a specified offset in a specified file in the file system by the steps of:

(a) reading attributes of the specified file including the allocation unit size of the specified file, the allocation unit size of the specified file being at least two file system data blocks;

(b) using the allocation unit size of the specified file and the specified offset of the specified file in a block mapping procedure to find an allocation unit pointer field in the inode of the specified file or in an indirect block of the specified file, the allocation unit pointer field being mapped to the specified offset in the specified file, the allocation unit pointer field is determined by dividing the specified offset of the specified file by the allocation unit size of the specified file; and (c) reading an allocation unit pointer from the allocation unit pointer field found by the block mapping procedure, and using the allocation unit pointer to perform a write access to an allocation unit of the data storage in order to perform the write access to the specified offset in the specified file, wherein a file system block for performing the read access is determined from the allocation unit pointer by using a result of dividing the specified offset of the specified file by the allocation unit size of the specified file.

11. The method as claimed in claim 10, wherein the allocation unit size of the specified file is stored in an attribute field in the inode of the specified file, and the step (a) includes reading the allocation unit size of the specified file from the attribute field in the inode of the specified file.

12. The method as claimed in claim 10, wherein the allocation unit pointer is a file system block number of a first file system block in the allocation unit of data storage accessed in the step (c).

13. The method as claimed in claim 10, wherein the step (b) is performed by dividing the specified offset by the allocation unit size of the specified file to produce an integer quotient, and using the integer quotient in a conventional UNIX block mapping procedure to find an allocation unit pointer field in the inode of the specified file or in an indirect block of the specified file, the allocation unit pointer field being mapped to the specified offset in the specified file.

14. The method as claimed in claim 13, wherein step (b) further includes producing an integer remainder of the division of the specified offset by the allocation unit size of the specified file, and step (c) further includes adding the allocation pointer to the integer remainder to produce a file system block number, and performing a write access to a file system block having the file system block number to perform the write access to the specified offset of the specified file.

15. The method as claimed in claim 10, wherein the file system includes block metadata, the block metadata includes zero flags for indicating whether or not respective file system data blocks are to be considered as storing data having a value of zero, and step (c) includes using the allocation pointer to write to a zero flag in the block metadata when performing a write access upon a respective file system data block at the specified offset in the specified file, so that the zero flag indicates that the respective file system data block at the specified offset in the specified file is not to be considered as storing data having a value of zero.

16. The method as claimed in claim 10, wherein the computer instructions, when executed by the data processor, further respond to a request to create a new file having a specified allocation unit size by allocating an inode for the new file, and then writing the specified allocation unit size in an allocation unit size field in the inode for the new file.

17. The method as claimed in claim 10, wherein the computer instructions, when executed by the data processor, further respond to a request to create a new file by allocating an inode for the new file, selecting an allocation unit size for the new file based on an expected size of the new file and attributes of the new file, and then writing the selected allocation unit size in an allocation unit size field in the inode for the new file.

18. A method of operating a file server, the file server having data storage storing a file system, and a data processor coupled to the data storage for access to files in the file system, the files being constructed of an inode for each of the files, indirect blocks, and allocation units of file system data blocks, each of the allocation units having one of the file system data blocks or a plurality of the file system data blocks having contiguous file system block numbers, and the file server having non-transitory computer readable storage medium coupled to the data processor and storing computer instructions including a file system manager program for managing the file system in the data storage, and each file in the file system having a respective allocation unit size attribute specifying an allocation unit size of each and every allocation unit in said each file, and the files in the file system having allocation units of different allocation unit sizes, a set of contiguous file system blocks being allocated as an allocation unit for each file in the file system based on the allocation unit size for said each file, an indirect block of each file including a set of allocation unit pointer fields, each allocation unit pointer field pointing to an allocation unit of said each file, said method comprising the data processor executing the computer instructions to perform a write access to a specified offset in a specified file in the file system by the steps of:

(a) reading attributes of the specified file including the allocation unit size of the specified file, the allocation unit size of the specified file being at least two file system data blocks;

(b) using the allocation unit size of the specified file and the specified offset of the specified file in a block mapping procedure to find an allocation unit pointer field in the inode of the specified file or in an indirect block of the specified file, the allocation unit pointer field being mapped to the specified offset in the specified file, the allocation unit pointer field is determined by dividing the specified offset of the specified file by the allocation unit size of the specified file; and (c) finding that the allocation pointer field contains a zero value, and in response to finding that the allocation pointer field contains a zero value, allocating a new allocation unit of data storage to the specified file by writing an allocation unit pointer to the allocation unit to the allocation pointer field, the new allocation unit of data storage having the allocation unit size of the specified file, and writing data to the new allocation unit of the data storage in order to perform the write access to the specified offset in the specified file, wherein a file system block for performing the read access is determined from the allocation unit pointer by using a result of dividing the specified offset of the specified file by the allocation unit size of the specified file.

19. The method as claimed in claim 18, wherein the file system includes block metadata, and the block metadata includes zero flags for indicating whether or not respective file system data blocks are to be considered as storing data having a value of zero, and step (c) includes using the allocation pointer to write to the zero flags in the block metadata to indicate that the file system data block at the specified offset in the specified file is not to be considered as storing data having a value of zero, and writing to another zero flag in the block metadata of another file system data block of the new allocation unit to indicate that said another file system data block of the new allocation unit is to be considered as storing data having a value of zero, and wherein the pointer field contains a zero flag indicating whether or not at least one file system data block of the new allocation unit of the data storage has a respective zero flag indicating that said at least one file system data block of the new allocation unit of the data storage is considered as storing data having a value of zero, and step (c) includes writing to the zero flag in the pointer field so that the zero flag in the pointer field indicates that at least one file system data block of the new allocation unit of the data storage has a respective zero flag indicating that said at least one file system data block of the new allocation unit of the data storage is considered as storing data having a value of zero.

20. The method as claimed in claim 18, wherein the step (b) is performed by dividing the specified offset by the allocation unit size of the specified file to produce an integer quotient and an integer remainder, and using the integer quotient in a conventional UNIX block mapping procedure to find an allocation unit pointer field in the inode of the specified file or in an indirect block of the specified file, the allocation unit pointer field being mapped to the specified offset in the specified file, and adding the allocation pointer to the integer remainder to produce a file system block number, and performing a write access to a file system block having the file system block number to perform the write access to the specified offset of the specified file.

* * * * *